United States Patent
Schmidt et al.

(10) Patent No.: US 9,152,271 B2
(45) Date of Patent: Oct. 6, 2015

(54) AUTOMATIC AND DYNAMIC SENSITIVITY CONTROL OF PROJECTED CAPACITIVE TOUCH SENSITIVE DETECTION SYSTEMS

(71) Applicant: HONEYWELL INTERNATIONAL INC., Morristown, NJ (US)

(72) Inventors: John F. L. Schmidt, Phoenix, AZ (US); Sonia R. Dodd, Phoenix, AZ (US); Brent D. Larson, Cave Creek, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 269 days.

(21) Appl. No.: 13/760,283

(22) Filed: Feb. 6, 2013

(65) Prior Publication Data

US 2014/0218329 A1  Aug. 7, 2014

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 6,492,979 B1 | 12/2002 | Kent et al. | |
| 7,847,789 B2 | 12/2010 | Kolmykov-Zotov et al. | |
| 8,063,891 B2 | 11/2011 | Chuang | |
| 8,274,491 B2 | 9/2012 | Souchkov | |
| 2006/0227115 A1 | 10/2006 | Fry | |
| 2008/0093130 A1 | 4/2008 | Lee et al. | |
| 2009/0219175 A1 | 9/2009 | Takashima et al. | |
| 2010/0164889 A1* | 7/2010 | Hristov et al. | 345/173 |
| 2010/0327953 A1 | 12/2010 | Lee et al. | |
| 2011/0273378 A1 | 11/2011 | Alameh et al. | |
| 2012/0218195 A1 | 8/2012 | Koh et al. | |
| 2012/0229421 A1 | 9/2012 | Kim et al. | |
| 2012/0268411 A1 | 10/2012 | Chen et al. | |
| 2012/0312676 A1* | 12/2012 | Salter et al. | 200/600 |
| 2012/0313767 A1* | 12/2012 | Sitarski | 340/425.5 |

FOREIGN PATENT DOCUMENTS

KR   20110033488 A   3/2011

* cited by examiner

*Primary Examiner* — Aneeta Yodichkas
*Assistant Examiner* — Kirk Hermann
(74) *Attorney, Agent, or Firm* — Ingrassia Fisher & Lorenz, P.C.

(57) ABSTRACT

Systems and methods of controlling the touch sensitivity of a projected capacitive touch detection system are provided. The temperature that is at least representative of the touch sensitive region temperature is sensed. Based on the sensed temperature, the numbers of the capacitive touch sensors that have different strength electric fields applied thereto are varied and/or the relative magnitudes of the different electric fields are varied. When installed in a vehicle, the operational state of the vehicle may also impact this operation.

18 Claims, 5 Drawing Sheets

AUTOMATIC AND DYNAMIC SENSITIVITY CONTROL OF PROJECTED CAPACITIVE TOUCH SENSITIVE DETECTION SYSTEMS

TECHNICAL FIELD

The present invention generally relates to projected capacitive touch detection systems, and more particularly relates to a system and method for automatically and dynamically controlling the touch sensitivity of projective capacitive touch detection systems.

BACKGROUND

Touch screens as user interfaces are enjoying widespread commercial success, and are implemented in numerous devices. These devices include, for example, cellular telephones, tablet computer devices, digital music players, and point of sale equipment, just to name a few. The ubiquitous presence and user familiarity of touch screens make this technology a natural candidate for use in aircraft cockpit displays. However, a vast majority of touch screen user interfaces are implemented using capacitive touch detection systems. These systems, when implemented in cockpit displays, can exhibit certain undesirable performance issues. For example, capacitive touch detection systems can be difficult to use when a user is wearing gloves. These systems are also susceptible to false touch detection when exposed to fluid spills or condensing moisture on the touch sensor surface.

Capacitive touch detection systems rely on an applied electric field that is scanned to detect changes in the field caused by a touch event. Thus, if the electric field strength is increased, it becomes feasible to use gloves to activate a touch event. Moreover, by adjusting the field strength, it is also possible to change the sensitivity to any liquids that may be on the sensor surface. Unfortunately, in the context of commercial aircraft, the relatively strong electric field that may be needed to implement gloved operation or to overcome the impact of fluids can increase radiated emissions from the touch sensor, thereby complicating qualification and certification activities.

Hence, there is a need for a capacitive touch detection system and method that implements touch sensitivity control without adjustability without unduly increasing radiated emissions therefrom. The present invention addresses at least this need.

BRIEF SUMMARY

In one embodiment, a method of controlling the touch sensitivity of a projected capacitive touch detection system having a touch sensitive region that includes multiple capacitive touch sensors includes sensing a temperature that is at least representative of touch sensitive region temperature. A first electric field having a first field strength magnitude is applied to a first number of the capacitive touch sensors, and a second electric field having a second field strength magnitude that is greater than the first field strength magnitude is applied to a second number of the capacitive touch sensors. Based on the sensed temperature, one or both of the following are varied: (i) the first and second numbers of the capacitive touch sensors and (ii) the second electric field magnitude.

In another embodiment, a method of controlling touch sensitivity of a projected capacitive touch detection system that includes a touch sensitive region and is installed in a vehicle includes sensing a temperature that is at least representative of the temperature of the touch sensitive region, and sensing an operational state of the vehicle. An electric field having a field strength is applied to a plurality of capacitive touch sensors. The field strength of the electric field is varied based on (i) the sensed temperature and (ii) the sensed operational state of the vehicle.

In still another embodiment, a projected capacitive touch detection system includes a touch screen display, a temperature sensor, and a touch controller. The touch screen display has a touch sensitive region that includes multiple capacitive touch sensors. The temperature sensor is configured to sense a temperature that is at least representative of touch sensitive region temperature and supply a temperature signal. The touch controller is in operable communication with the touch screen display and the temperature sensor. The touch controller is coupled to receive the temperature signal and is configured to apply a first electric field having a first field strength magnitude to a first number of the capacitive touch sensors, apply a second electric field having a second field strength magnitude that is greater than the first field strength magnitude to a second number of the capacitive touch sensors, and selectively vary, based on the sensed temperature, one or both of (i) the first and second numbers of the capacitive touch sensors and (ii) the second electric field magnitude.

In yet a further embodiment, a projected capacitive touch detection system for use in a vehicle includes a touch screen display, a temperature sensor, a vehicle data source, and a touch controller. The touch screen display has a touch sensitive region that includes multiple capacitive touch sensors. The temperature sensor is configured to sense a temperature that is at least representative of touch sensitive region temperature and supply a temperature signal. The vehicle data source is configured to supply data representative of a state of the vehicle. The touch controller is in operable communication with the touch screen display, the temperature sensor, and the vehicle data source. The touch controller is coupled to receive the temperature signal and the data representative of the state of the vehicle, and is configured to determine an operational state of the vehicle, apply an electric field having a field strength to a plurality of the capacitive touch sensors, and vary the field strength of the electric field based on (i) the sensed temperature and (ii) the operational state of the vehicle.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
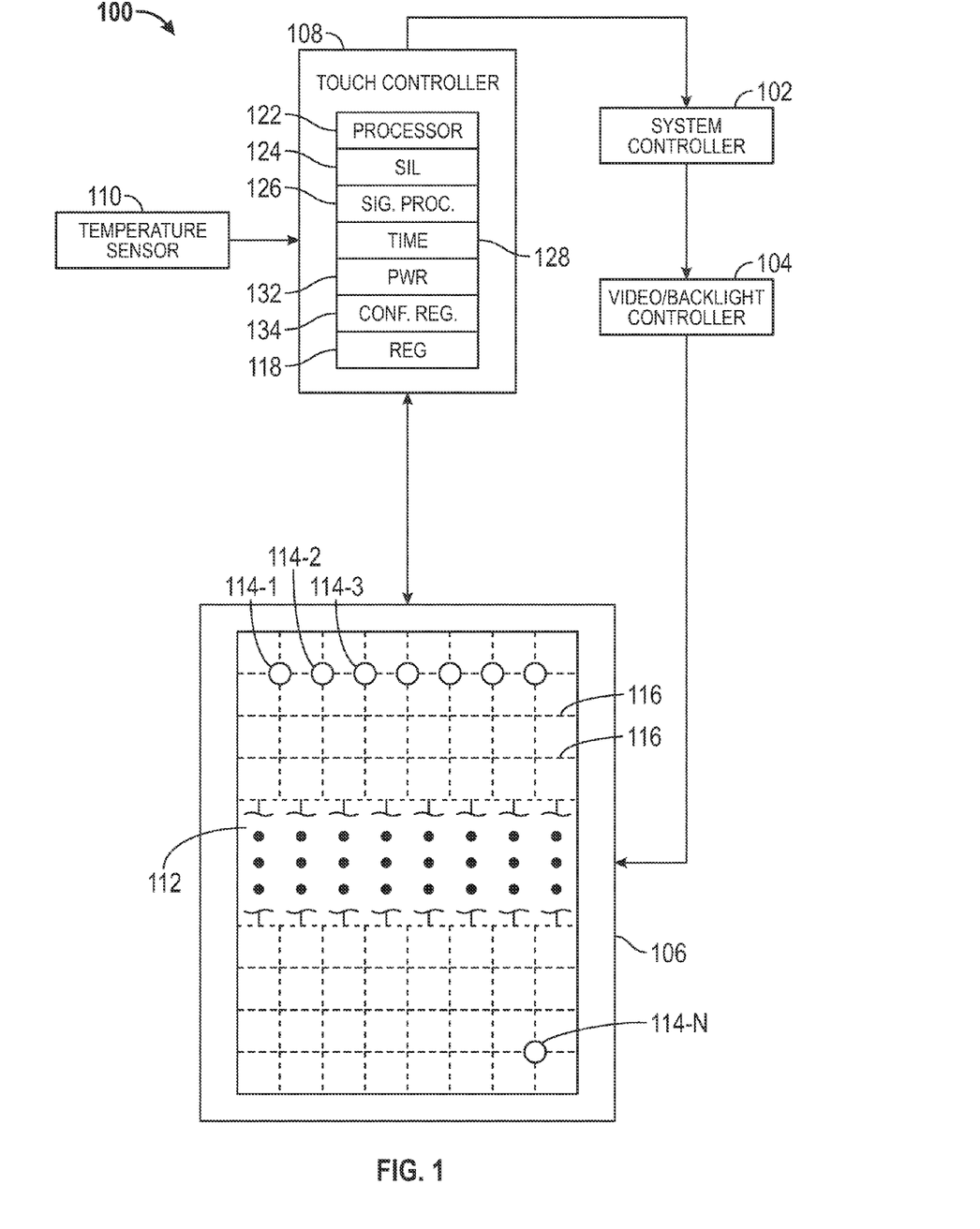
FIG. 1 depicts a functional block diagram of a projected capacitance touch sensitive display system.

Referring to FIG. 1, a functional block diagram of a projected capacitance touch sensitive display system 100 is depicted. The depicted system 100 includes a system controller 102, a video/backlight controller 104, a touch screen display 106, a touch controller 108, and a temperature sensor 110. The system controller 102 is coupled to receive touch data supplied from the touch controller 108 and is configured, upon receipt thereof, to generate and supply various signals to the video/backlight controller 104. The video/backlight controller 104 is responsive to these signals to render and display various images on the touch screen display 106. It will be appreciated that the system controller 102 and video/backlight controller 104 may be variously implemented and may include at least one Central Processing Unit (CPU), Graphics Processing Unit (GPU), embedded controller, microcontroller, field programmable gate array (FPGA), or other device, or various combinations of these devices to process the touch data and display images. It will additionally be appreciated that the system controller 102 may be variously coupled to receive touch data from the touch controller 108. Some non-limiting means include RS-232, I2C, SPI, or USB wired serial interfaces, and various wireless data transmission protocols.

The touch screen display 106 includes a touch sensitive region 112. The touch sensitive region 112 is adapted to receive touch-based input commands from a non-illustrated user and is configured, upon receipt thereof, to generate touch data representative of the touch-based input commands. As is generally known, touch-based input commands are commands that a user inputs to the touch sensitive region 112 of a touch screen display 106 using one or more fingers. The touch-based commands may be gesture-based (e.g., a "zoom" command using two fingers), single-touch based, or multi-touch based inputs. It will be appreciated that the touch screen display 106 may be implemented using any one of numerous types of touch screen displays configured to receive touch-based input commands from a user. These display types include, but are not limited to, LCDs (liquid crystal displays), LED (light emitting diode) displays, and OLED (organic LED) displays, just to name a few.

The touch sensitive region 112 is implemented as a capacitive touch sensor, and more particularly a projected capacitive touch sensor. As is generally known, projected capacitive touch sensors use a plurality of capacitive sensors 114 (e.g., 114-1, 114-2, 114-3, . . . 114-N). More specifically, the capacitive sensors 114 are implemented using a plurality of conductors 116 that are embedded into the touch sensitive region 112, and are arranged as a matrix of rows and columns to form a grid pattern. When the touch screen display 106 is energized, a voltage is applied to the conductors 116, which creates a nominal electrostatic field. When an object, such as a finger of a user, interacts with (e.g., comes in proximity to or contacts) the touch sensitive region 112 (referred to herein as "a touch event"), it disturbs the local electrostatic field and changes the capacitance at the point of interaction. As will be described further below, changes in capacitance that are caused by touch events are sensed by the touch controller 108.

The touch controller 108 is in operable communication with at least the touch sensitive region 112. The touch controller 108 is configured to apply an electric field to each of the capacitive sensors 114, scan the capacitive sensors 114 at a scanning frequency, and detect the capacitance changes that are produced by touch events. When a touch event is detected, the touch controller 108 stores touch data representative thereof in one or more onboard touch data storage registers 118, and alerts the system controller 102 that a touch event has occurred. The system controller 102 then reads the touch data from the appropriate touch data storage register(s) 118.

The touch controller 108 may be variously implemented, but in the depicted embodiment the touch controller 108 is a generic microcontroller for projected capacitive touch sensors. These types of touch controllers 108 typically include a processor 122 wrapped with serial interface logic 124, mixed signal processing 126, timers 128, power management 132, and touch system configuration registers 134. The touch system configuration registers 134 typically have default values stored therein that are established by the touch controller manufacturer or the display system integrator, and store parameters representative of, for example, the applied field strength, the scanning frequency, and various other operating parameters. The values in the touch system configuration registers 134 may, however, be modified via either firmware in the touch controller 108 or via the system controller 102. In the depicted embodiment, and as will be described further below, the applied field strength is varied, or at least selectively varied, based on temperature. Before providing this description, the temperature sensor 110 will be briefly described.

The temperature sensor 110 is configured to sense a temperature that is at least representative of the touch sensitive region 112, and to supply a temperature signal representative thereof. In some embodiments, the temperature sensor 110 may be mounted directly on the touch sensitive region 112. In other embodiments, the temperature sensor 110 is disposed at a position relative to the touch sensitive region 112 such that the sensed temperature, and thus the supplied temperature signal, is at least representative of the touch sensitive region 112 temperature. For example, the temperature sensor 110 may be disposed and configured to sense the ambient air temperature proximate the touch sensitive region 112.

Preferably, the temperature sensor 110 is in operable communication with, and supplies the temperature signal to, the touch controller 108. The touch controller 108, as noted above, is configured to selectively vary the sensitivity of the capacitive sensors 114 based on the sensed temperature. To do so, the touch controller 108, at least in some embodiments, is configured to interleave relatively high-sensitive touch detection with relatively less sensitive, nominal touch detection. In other embodiments, which will be described further below, the touch controller 108 is configured to selectively vary the field strength to all of the capacitive touch sensors 114.

When configured to implement the interleaving embodiment, the touch controller 108 will apply a first electric field to a first number of the capacitive touch sensors 114 and a second electric field to a second number of the capacitive touch sensors 114. The first electric field has a first field strength magnitude, and the second electric field has a second field strength magnitude that is greater than the first field strength magnitude. Thus, as may be appreciated, relatively high-sensitivity touch detection is implemented when the second electric field is applied to the second number of capacitive touch sensors 114. As may also be appreciated, the specific number of capacitive touch sensors 114 that comprise the first and second pluralities may vary, the relative differences between the two numbers may vary, and the specific sensors 114 included in the first and second numbers may vary.

Figure 2:
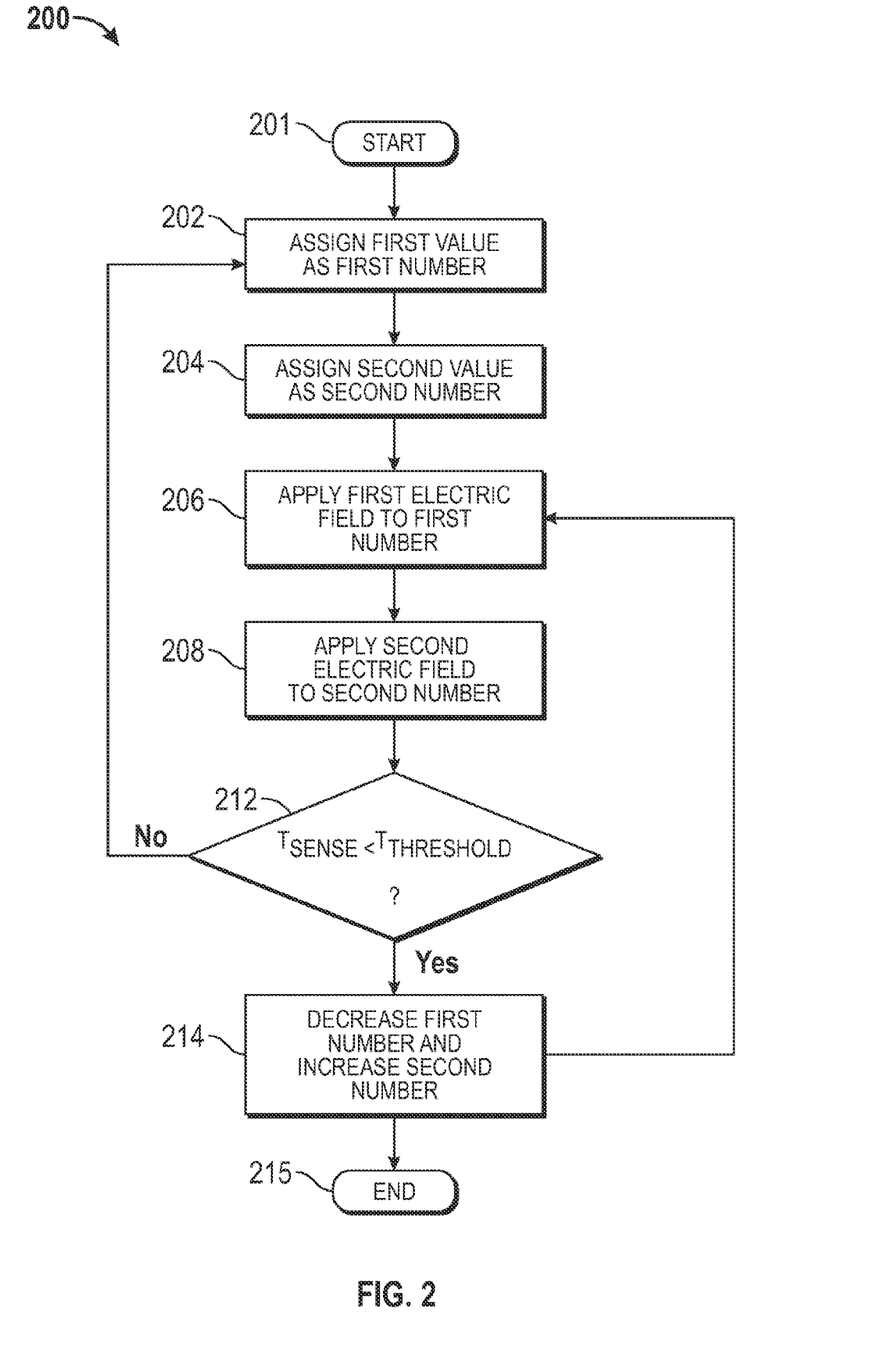
FIG. 2 depicts a process, in flowchart form, of sensitivity interleaving that may be implemented by the system of FIG. 1.

To more clearly illustrate the overall interleaving process, reference should now be made to FIG. 2, which depicts an exemplary generalized process 200 in flowchart form. Initially, the touch controller 108 assigns a first value as the first number of capacitive touch sensors 114 (202), and a second value as the second number of capacitive touch sensors 114 (204). As alluded to above, the specific values of, and relative differences between, the first and second values may vary. Indeed, the first and second values may be equal or unequal. The first and second numbers may each be representative of a specific number of individual capacitive touch sensors 114 (including zero), a number of groups of capacitive touch sensors 114, or the like. Moreover, the specific numerical values may be preset values, operator selectable values, or values that are randomly selected, for example, upon power up.

After the first and second numbers are assigned, the touch controller 108 applies the first electric field to the first number of capacitive touch sensors 114 (206), and applies the second electric field to the second number of capacitive touch sensors 114 (208). The touch controller 108 also determines, based on the temperature signal, if the temperature of the touch sensitive region 112 ($T_{SENSE}$) is below a predetermined threshold temperature ($T_{THRESHOLD}$) (212). If the temperature of the touch sensitive region 112 is not below the predetermined threshold temperature, then the previous process steps (202-212) are repeated. If, however, the temperature of the touch sensitive region 112 is below the predetermined threshold temperature, then the touch controller 108 varies the overall sensitivity of the touch sensitive region 112 (214). To do so, the touch controller 108, as will now be described, may vary one or more parameters. Before doing so, however, it should be noted that the predetermined threshold temperature may vary, and is selected to correspond to a temperature at which a user of the system is likely to be wearing gloves.

The parameters that the touch controller 108 may vary, based on the sensed temperature, include the first and second numbers of the capacitive touch sensors 114, the second electric field magnitude, or both. In other words, the touch controller 108 could, in some embodiment, be configured to keep the second electric field strength magnitude constant, but decrease the first number of the capacitive touch sensors 114 and increase the second number of the capacitive touch sensors 114. In doing so, a relatively larger number of the capacitive touch sensors 114 will have the second electric field magnitude applied thereto, thereby increasing the overall sensitivity. In other embodiments, the touch controller 108 could be configured to maintain the first and second numbers of capacitive touch sensors 114 at the initial values, while increasing the second electric field magnitude. As may be appreciated, this too will increase the overall sensitivity. In yet other embodiments, the touch controller 108 may increase the overall sensitivity by decreasing the first number of capacitive touch sensors 114, increasing the second number of capacitive touch sensors 114, and increasing the second electric field magnitude.

Before proceeding further, it is noted that the first and second numbers of capacitive sensors 114 could be varied using various techniques. For example, if the capacitive touch sensors 114 are configured as an array, arranged in multiple lines of sensors, and the touch controller 108 is configured to progressively scan the array, line-by-line, from one end of the array to the other (e.g., top-to-bottom), then the touch controller 108 could be configured to apply the second electric field to every $N^{th}$ line of the array. The value of "N" could then be selectively varied with the sensed temperature. As an example of this, if it were assumed that "N" was initially set to 5, then the touch controller 108 would initially apply the second electric field to every $5^{th}$ line of the array. However, if the temperature of the touch sensitive region 112 decreased below the predetermined threshold temperature, then the value of "N" may decrease to, for example, 4 so that the touch controller 108 will then apply the second electric field to every $4^{th}$ line of the array.

Alternatively, the touch controller 108 could be configured to apply the second electric field to various groups of lines in the array of capacitive touch sensors 114. For example, it could be configured to apply the second electric field to every $N^{th}$ to $N^{th}+1$ lines, $N^{th}$ to $N^{th}+2$ lines, $N^{th}$ to $N^{th}+3$ lines, ..., or $N^{th}$ to $N^{th}+n$ lines. Here again, the value of "N" could then be selectively varied with the sensed temperature. As an example of this technique, if it is assumed that the touch controller 108 is configured to apply the second electric field to every $N^{th}$ to $N^{th}+2$ lines and that "N" is initially set to 5, then the touch controller 108 will initially apply the second electric field to every $5^{th}$ to $5^{th}+2$ lines of the array (e.g., the $5^{th}$-$7^{th}$ lines, the $10^{th}$-$12^{th}$ lines, the $15^{th}$-$17^{th}$ lines, etc.). However, if the temperature of the touch sensitive region 112 decreases below the predetermined threshold temperature, then the value of "N" may decrease to, for example, 4 so that the touch controller 108 will then apply the second electric field to every $4^{th}$ to $4^{th}+2$ lines of the array (e.g., the $4^{th}$-$6^{th}$ lines, the $8^{th}$-$10^{th}$ lines, the $12^{th}$-$14^{th}$ lines, etc.). Yet another variation would be to apply the second electric field to every $N^{th}$ to $N^{th}+n$ lines, where the value of "n" would be selectively varied with the sensed temperature. As may be appreciated, the variations are numerous, and those described herein are merely exemplary and non-limiting of those that may be implemented.

The non-limiting examples above are described in the context of the touch controller 108 being configured to implement progressive and/or interlaced scanning techniques. In other embodiments, the touch controller 108 may be configured to implement various other scanning techniques, such as random scanning of individual capacitive touch sensors 114, lines of the capacitive touch sensors 114, or groups of capacitive touch sensors that define a region on the touch sensitive region 112. In such embodiments, the touch controller 108 may be configured to randomly apply the first and second electric fields to randomly selected individual, lines, or groups of the capacitive touch sensors 114.

In addition to the various scanning techniques that may be used (progressive, interlaced, random, etc.), numerous other techniques for varying the first and second numbers of capacitive touch sensors 114 may also be used. In particular, and as will now be described, these numbers may be varied within scanning cycles (or frames), or varied on a cycle-to-cycle (or frame-to-frame) basis.

Figure 3:
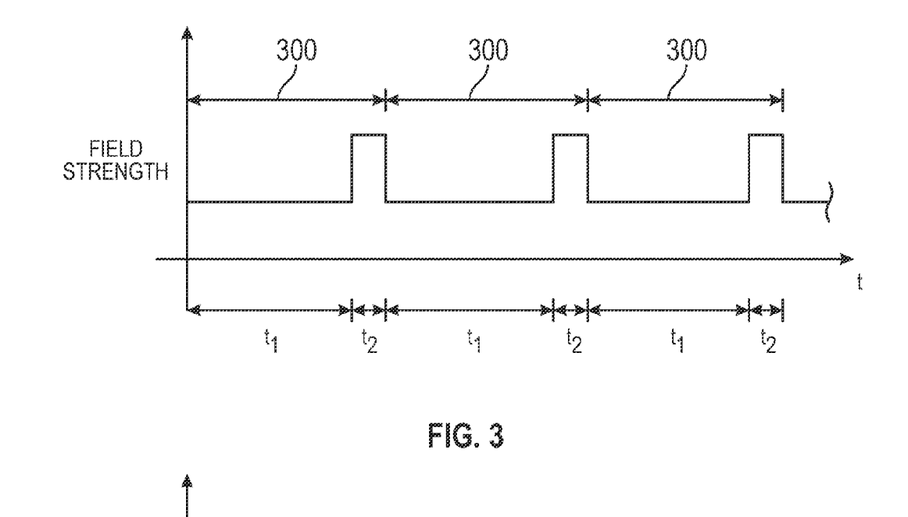
FIG. 3 depicts a simplified representation of an example of sensitivity interleaving within scanning cycles.

Referring to FIG. 3, an example where the first and second numbers of capacitive touch sensors 114 are varied within scanning cycles is depicted. As illustrated therein, a single scanning cycle 300 of the capacitive touch sensors 114 is represented using two time intervals—a first time interval ($t_1$) and a second time interval ($t_2$). With this embodiment, the touch controller 108 is configured is apply the first electric field during the first time interval ($t_1$) and the second electric field during the second time interval ($t_2$). The touch controller 108 is additionally configured, based on the sensed temperature, to selectively adjust the respective time intervals ($t_1$, $t_2$). As may be appreciated, as the lengths of the first and second time intervals ($t_1$, $t_2$) are varied (from zero to a maximum value), the numbers of capacitive touch sensors 114 to which the first and second electric fields are applied will also vary. Concomitantly, the first and second numbers of capacitive sensors 114 will also vary. As may be additionally appreciated, the touch controller 108 may be configured, when implementing this technique, to implement any one or more of numerous scanning techniques (e.g., progressive, interlaced, random, etc.) during the scanning cycle 300. Moreover, depending upon the scanning technique being used, the second time interval ($t_2$) could, in some embodiments, be divided into multiple sub-intervals and distributed more evenly throughout the time interval ($t_1$).

Figure 4:
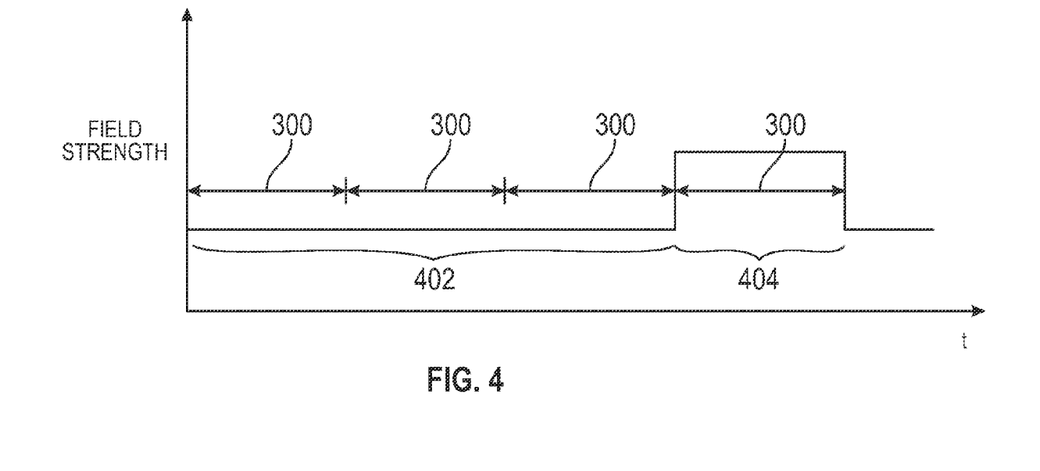
FIG. 4 depicts a simplified representation of an example of sensitivity interleaving on a cycle-to-cycle basis.

With reference now to FIG. 4, an example where the first and second numbers of capacitive touch sensors 114 are varied on a cycle-to-cycle basis is depicted. When this technique is implemented the first time interval ($t_1$) comprises a first number 402 of scanning cycles 300 of the capacitive touch sensors 114, and the second time interval ($t_2$) comprises a second number 404 of scanning cycles 300 of the capacitive touch sensors 114. Similar to the above-described embodiment, the touch controller 108 is configured, based on the sensed temperature, to selectively adjust the respective time intervals ($t_1$, $t_2$). In this embodiment, however, the touch controller 108 does so by selectively varying the first number 402 and second number 404 of scanning cycles. As may be appreciated, the touch controller 108 may be configured, when implementing this technique, to implement any one or more of numerous scanning techniques (e.g., progressive, interlaced, random, etc.) during the scanning cycle 300.

In yet another embodiment, the touch controller 108 is configured to implement variations in the first and second numbers of capacitive touch sensors 114 based upon when touch events are detected. In particular, as depicted in flowchart form in FIG. 5, the touch controller 108, after implementing steps 202-208 of FIG. 2, will determine if a touch event is detected using one or more of the first number of capacitive touch sensors 114 (e.g., those to which the first electric field strength magnitude are applied) (502). If not, the touch controller then determines if a touch event is detected using one or more of the second number of capacitive touch sensors 114 (e.g., those to which the second electric field strength magnitude are applied) (504). If no touch events are detected in steps 502 or 504, then the process 500 continues with steps 212 (or 212 and 214) of FIG. 2.

Figure 5:
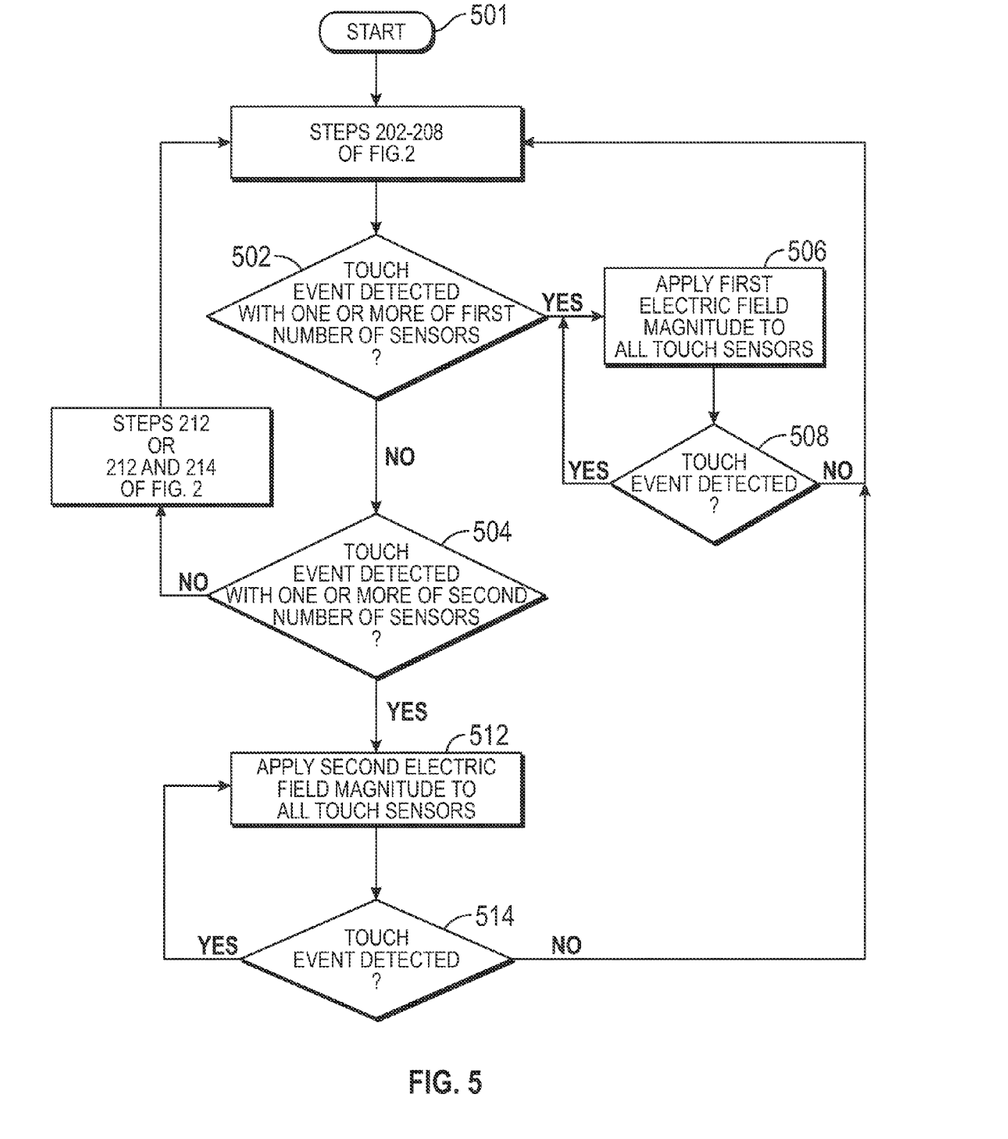
FIG. 5 depicts another process, in flowchart form, of sensitivity adjustment that may be implemented by the system of FIG. 1.

If, however, a touch event is detected in step 502, then the touch controller 108 applies the first electric field to all of (e.g., the first and second numbers) of capacitive touch sensors 114 (506). This continues (506-508) until no touch event is detected, at which point the touch controller 108 once again applies the first electric field to the first number of the capacitive touch sensors 114, and the second electric field to the second number of the capacitive touch sensors 114 (steps 202-208).

If a touch event is detected in step 504, then the touch controller 108 applies the second electric field to all of (e.g., the first and second numbers) of capacitive touch sensors 114 (512). This continues (512-514) until no touch event is detected, at which point the touch controller 108 once again applies the first electric field to the first number of the capacitive touch sensors 114, and the second electric field to the second number of the capacitive touch sensors 114 (steps 202-208).

Up to this point, the operational context of the projected capacitance touch sensitive display system 100 has not been described. It will be appreciated, however, that the system described herein may be implemented in various systems and environments. For example, the system 100 may be implemented in a vehicle, such as an automobile, a watercraft, a spacecraft, or an aircraft. The operation of the system 100 may vary depending upon the particular vehicle in which the system 100 is implemented. That is, the operation of the system 100 may vary based upon whether the vehicle is in a predetermined operational state. For example, if the vehicle is an aircraft, the operation of the system 100 may vary based upon whether the aircraft is in an airborne operational state.

Figure 6:
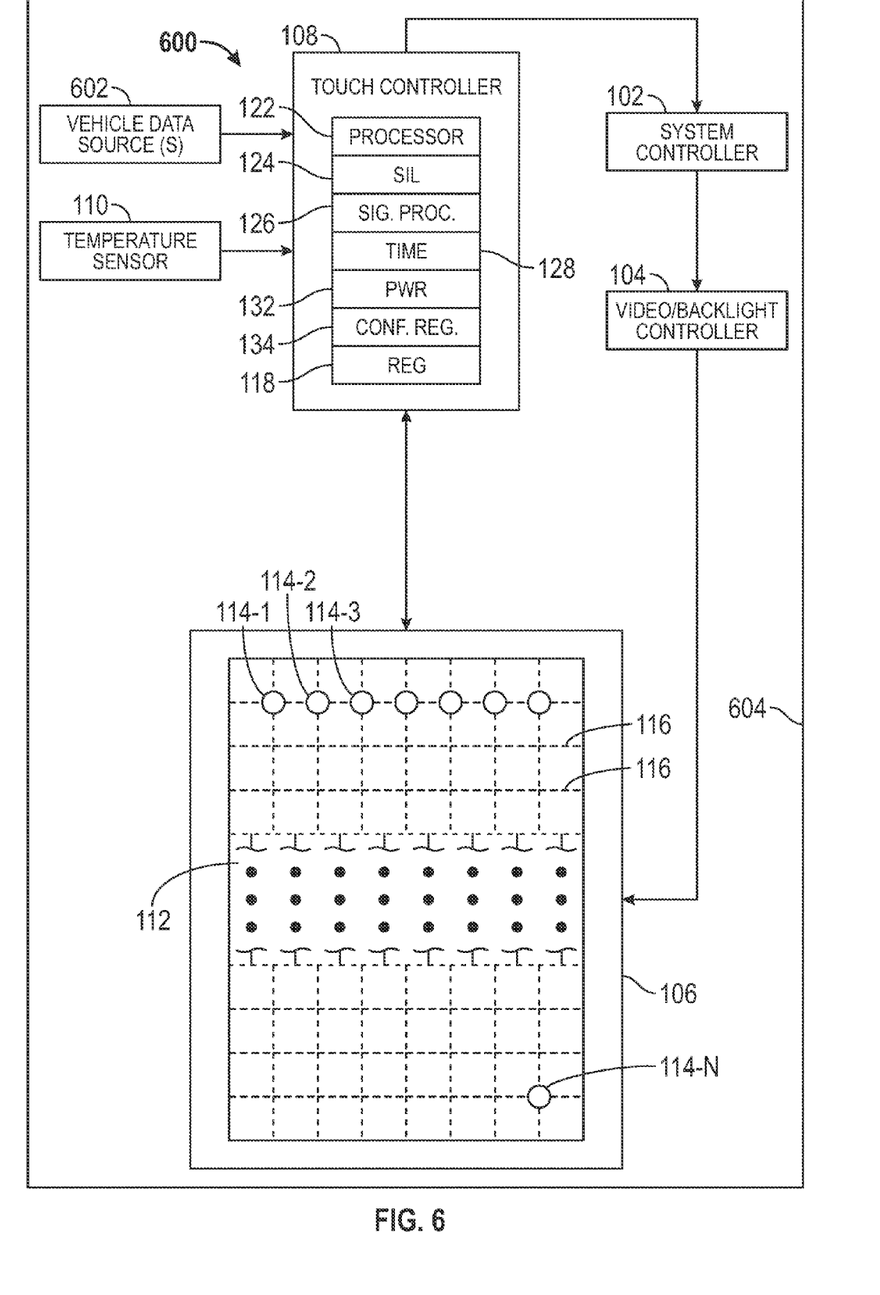
FIG. 6 depicts a functional block diagram of another embodiment of a projected capacitance touch sensitive display system.

Referring now to FIG. 6, a functional block diagram of an embodiment of a projected capacitance touch sensitive display system 600 that takes into account vehicle operational state is depicted. This system 600 includes all of same functional blocks as the system 100 depicted in FIG. 1 and described above. Thus, descriptions of the blocks that function identical to those of the previously described system 100 will not be repeated. In addition to the previously described functional blocks, the system 600 depicted in FIG. 6 includes one or more vehicle data sources 602. The one or more vehicle data sources 602 may be variously implemented, but are preferably configured to supply data that are at least representative of the predetermined operational state of the vehicle 604 in which the system 600 is installed.

No matter the particular type or number of vehicle data sources 602, each is preferably in operable communication with, and supplies these data to, the touch controller 108. The touch controller 108, in response to these data, determines the operational state of the vehicle 604 and selectively varies the field strength of the electric field supplied to the capacitive touch sensors 114 based on both the sensed temperature and the determined vehicle operational state. In one embodiment, when the vehicle 604 is determined to not be in the predetermined operational state, the touch controller 108 will apply the above-described first electric field (e.g., nominal sensitivity) to the capacitive touch sensors 114 regardless of the sensed temperature. However, when the operational state of the vehicle is in the predetermined operational state, the touch controller 108 will apply the above-described first electric field to the capacitive touch sensors 114 when the sensed temperature is not below the predetermined threshold temperature ($T_{THRESHOLD}$), but will apply the above-described second electric field (e.g., relatively high sensitivity) to the capacitive touch sensors 114 when the sensed temperature is below the predetermined threshold temperature ($T_{THRESHOLD}$).

In other embodiments, the touch controller 108 may be configured to implement one of the sensitivity interleaving embodiments described above. In these embodiments, the touch controller 108 may be configured to vary the numbers that comprise the first and second pluralities of capacitive touch sensors 114 only when the operational state of the vehicle is in the predetermined operational state and the sensed temperature is below the predetermined threshold temperature ($T_{THRESHOLD}$).

To provide an embodiment specific to a particular type of vehicle, when the vehicle 604 is an aircraft, the desired operational state is, at least in one embodiment, aircraft flight profile, and more specifically whether or not the aircraft 604 is non-airborne (e.g., on the ground). In such embodiments, the vehicle data source(s) 602 that may be used to make this determination may include data that are directly representative of aircraft flight status, such as, for example, ground speed, air speed, altitude, or weight-on-wheels, just to name a few. The data may also (or instead) include data that are indirectly representative of aircraft flight status, such as, for example, pitot pressure, or engine speed, just to name a few. No matter the particular type or number of vehicle data sources 602, each is preferably in operable communication with, and supplies these data to, the touch controller 108. The touch controller 108, in response to these data, determines the operational state of the aircraft 604 and, as described above, selectively varies the field strength of the electric field supplied to the capacitive touch sensors 114 based on both the sensed temperature and the operational state of the vehicle. In some embodiments, the touch controller 108 may also be configured to vary the number of capacitive touch sensors 114 that to which the variable field strength electric field is applied.

It is contemplated that in some embodiments the touch controller 108 may, for any one of numerous reasons, be unable to receive the temperature signal from the temperature sensor 110. In such instances, the temperature sensor 110 is in operable communication with, and supplies the temperature signal to, the system controller 102. Moreover, the system controller 102 is configured to program one or more of the touch system configuration registers 134 in the touch controller 108 based on its assessment of the temperature of the touch sensitive region 112. It is also noted that temperature hysteresis could be, and preferably is, implemented to ensure that system operation remains solidly within the desired temperature regime and does not oscillate between the operating modes.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of controlling the touch sensitivity of a projected capacitive touch detection system having a touch sensitive region that includes multiple capacitive touch sensors, comprising the steps of:
sensing a temperature that is at least representative of touch sensitive region temperature;
applying a first electric field to a first number of the capacitive touch sensors, the first electric field having a first field strength magnitude;
applying a second electric field to a second number of the capacitive touch sensors, the second electric field having a second field strength magnitude that is greater than the first field strength magnitude;
comparing the sensed temperature to a predetermined threshold temperature; and
when the sensed temperature is less than the predetermined threshold temperature, performing one or both of:
(i) decreasing the first number of capacitive touch sensors and increasing the second number of the capacitive touch sensors, and
(ii) varying the second electric field magnitude.

2. The method of claim 1, wherein the projected capacitive touch detection system is disposed within a vehicle, and wherein the method further comprises:
processing data to determine an operational state of the vehicle; and
when the vehicle is in a predetermined operational state, selectively varying, based on the sensed temperature, one or both of:
(i) the first and second numbers of the capacitive touch sensors, and
(ii) the second electric field magnitude.

3. The method of claim 2, wherein:
the vehicle is an aircraft; and
the predetermined operational state is non-airborne.

4. The method of claim 1, wherein:
the step of applying the first electric field to the first number of the capacitive touch sensors comprises applying the first electric field for a first time interval;
the step of applying the second electric field to the second number of the capacitive touch sensors comprises applying the second electric field for a second time interval; and
the step of selectively varying the first and second numbers of the capacitive touch sensors comprises selectively varying at least the second time interval.

5. The method of claim 4, further comprising:
comparing the sensed temperature to a predetermined threshold temperature; and
at least selectively increasing the second time interval when the sensed temperature is less than the predetermined threshold temperature.

6. The method of claim 4, wherein:
the first time interval and the second time interval together comprise a single scanning cycle of the capacitive touch sensors.

7. The method of claim 6, further comprising at least selectively varying the first time interval.

8. The method of claim 4, wherein:
the first time interval comprises a first number of scanning cycles of the capacitive touch sensors; and
the second time interval comprises a second number of scanning cycles of the capacitive touch sensors.

9. The method of claim 8, wherein the step of at least selectively varying the second time interval comprises at least selectively varying the second number of scanning cycles.

10. The method of claim 4, wherein the projected capacitive touch detection system is disposed within a vehicle, and wherein the method further comprises:
processing data to determine an operational state of the vehicle; and
when the vehicle is in a predetermined operational state, varying the second time interval based on the sensed temperature.

11. The method of claim 10, wherein:
the vehicle is an aircraft; and
the predetermined operational state is non-airborne.

12. The method of claim 1, further comprising:
detecting a touch event with one or more of the first number of the capacitive touch sensors and, in response thereto:
discontinuing application of the second electric field to the second number of capacitive touch sensors; and
applying the first electric field to the first and second numbers of capacitive touch sensors.

13. The method of claim 12, further comprising:
detecting no touch events and, in response thereto:
applying the first electric field to the first number of the capacitive touch sensors; and
applying the second electric field to the second number of the capacitive touch sensors.

14. The method of claim 1, further comprising:
detecting a touch event with only one or more of the second number of the capacitive touch sensors and, in response thereto:
discontinuing application of the first electric field to the first number of capacitive touch sensors; and
applying the second electric field to the first and second numbers of capacitive touch sensors.

15. The method of claim 14, further comprising:
detecting no touch events and, in response thereto:
applying the first electric field to the first number of the capacitive touch sensors; and
applying the second electric field to the second number of the capacitive touch sensors.

16. A method of controlling touch sensitivity of a projected capacitive touch detection system installed in a vehicle, the projected capacitive touch detection system including a touch sensitive region, the method comprising the steps of:
sensing a temperature that is at least representative of the temperature of the touch sensitive region;
sensing an operational state of the vehicle;
applying an electric field to a plurality of capacitive touch sensors, the electric field having a field strength;
processing data to determine when the vehicle is in a predetermined operational state;
comparing the sensed temperature to a predetermined threshold temperature; and
increasing the field strength of the electric field when (i) the vehicle is in the predetermined operational state and (ii) the sensed temperature is less than the predetermined threshold temperature.

17. A projected capacitive touch detection system, comprising:
a touch screen display having a touch sensitive region, the touch sensitive region including multiple capacitive touch sensors;
a temperature sensor configured to sense a temperature that is at least representative of touch sensitive region temperature and supply a temperature signal; and
a touch controller in operable communication with the touch screen display and the temperature sensor, the touch controller coupled to receive the temperature signal and configured to:

apply a first electric field to a first number of the capacitive touch sensors, the first electric field having a first field strength magnitude, apply a second electric field to a second number of the capacitive touch sensors, the second electric field having a second field strength magnitude that is greater than the first field strength magnitude, compare the sensed temperature to a predetermined threshold temperature; and when the sensed temperature is less than the predetermined threshold temperature, performing one or both of:
  (i) decreasing the first number of capacitive touch sensors and increasing the second number of the capacitive touch sensors, and
  (ii) varying the second electric field magnitude.

18. A projected capacitive touch detection system for use in a vehicle, the system comprising:

a touch screen display having a touch sensitive region, the touch sensitive region including multiple capacitive touch sensors;

a temperature sensor configured to sense a temperature that is at least representative of touch sensitive region temperature and supply a temperature signal;

a vehicle data source configured to supply data representative of a state of the vehicle; and a touch controller in operable communication with the touch screen display, the temperature sensor, and the vehicle data source, the touch controller coupled to receive the temperature signal and the data representative of the state of the vehicle, the touch controller configured to:

determine an operational state of the vehicle, apply an electric field to a plurality of the capacitive touch sensors, the electric field having a field strength, and vary the field strength of the electric field based on (i) the sensed temperature and (ii) the operational state of the vehicle.

* * * * *